United States Patent [19]

Blevins et al.

[11] Patent Number: 5,338,813

[45] Date of Patent: Aug. 16, 1994

[54] COPOLYMERS OF VINYL DIOXOLANES AND MALEIMIDES

[75] Inventors: Richard W. Blevins, Rochester; S. Richard Turner, Pittsford, both of N.Y.

[73] Assignee: Eastman Chemical Company, Kingsport, Tenn.

[21] Appl. No.: 185,081

[22] Filed: Jan. 24, 1994

Related U.S. Application Data

[62] Division of Ser. No. 998,205, Dec. 30, 1992, Pat. No. 5,310,839.

[51] Int. Cl.$^5$ .......................... C08F 2/06; C08F 4/04; C08F 4/34; C08F 222/40; C08F 224/00
[52] U.S. Cl. .................................... 526/208; 526/213; 526/219.6; 526/227; 526/262; 526/270
[58] Field of Search ............ 526/262, 208, 213, 219.6, 526/227, 262, 270

[56] References Cited

U.S. PATENT DOCUMENTS 5,019,635  5/1991  Blevins et al. ................... 526/266

Primary Examiner—Joseph L. Schofer
Assistant Examiner—Wu C. Cheng
Attorney, Agent, or Firm—J. Frederick Thomsen

[57] ABSTRACT

Copolymers are produced when a 4-vinyl-1,3-dioxolane monomer is copolymerized with an imidized maleic anhydride (for example, maleimide) monomer in the presence of a free radical initiator. Alternatively, a maleamic acid or maleimide functionality may be introduced into a copolymer containing a 4-vinyl-1,3-dioxolane and maleic anhydride by introducing a primary amine into the reaction mixture. Also, the dioxolane reactant may be introduced into the polymer by reacting 3,4-epoxy-1-butene in a ketone reaction solvent. The structure and composition of the product copolymer are controlled by both the sequence and conditions of the reaction. Products of this invention can be cast as clear films and can also be used as reactive polymers.

4 Claims, No Drawings

COPOLYMERS OF VINYL DIOXOLANES AND MALEIMIDES

This is a divisional application of copending application Ser. No. 07/998,205 filed Dec. 30, 1992, now U.S. Pat. No. 5,310,839.

FIELD OF THE INVENTION

This invention relates to copolymers and to processes for their formation.

BACKGROUND OF THE INVENTION

U.S. Pat. Nos. 5,013,806; 5,077,365; and 5,071,932 (issued to Blevins and Turner in 1991) disclose copolymers of 4-vinyl-1,3-dioxolane with maleic anhydrides. Other than the compounds and processes described in these commonly-owned patents, no other known reference discloses copolymers of a 4-vinyl-1,3-dioxolane with maleic anhydride or its derivatives. While the copolymers of Blevins and Turner are useful, it would be desirable to have copolymers that are more resistant to moisture and hydrolysis.

SUMMARY OF THE INVENTION

The present invention provides a process for making novel copolymers from (i) a maleimide reactant monomer and (ii) a dioxolane reactant monomer. The invention also provides novel copolymers produced thereby.

More particularly, the present invention provides a process for preparing a copolymer comprising contacting:

(i) a maleimide reactant having up to about 24 carbon atoms; and (ii) a dioxolane reactant having the formula:

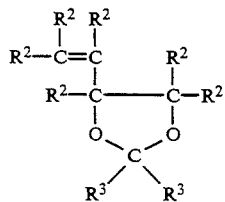

Formula I wherein:
each $R^2$ independently represents hydrogen or alkyl having 1 to 4 carbon atoms;
each $R^3$ independently represents hydrogen, alkyl, or aryl having up to about 10 carbon atoms or when taken together represent a cyclic alkylene or arylene group having up to 20 carbon atoms;
said process being conducted in the presence of a free radical initiator, at a temperature within the range of from −10° C. to about 180° C.

The reaction may be carried out in a ketone, aldehyde, ester or non-polar solvent, or in the absence of added solvent.

The process of the invention provides several advantages. For example, the process can produce polymers at mild reaction temperatures and pressures thereby avoiding high energy consumption. Further, the process can produce polymers which are soluble in organic solvents, alcohols and water and, hence, need not be melted prior to use as coating materials. The convenience of using water as a solvent also has environmental and regulatory benefits. Additionally, the process of the present invention avoids the more rigorous requirements of anionic polymerization procedures.

The product of the invention described above is a copolymer having repeating units of the formula:

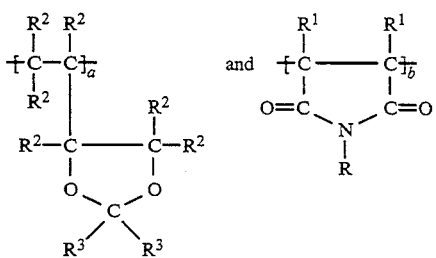

wherein:
R represents hydrogen, alkyl, aryl, substituted aryl, or an alicyclic hydrocarbon having from 1 to about 20 carbon atoms;
each $R^2$ independently represents hydrogen or alkyl having 1 to 4 carbon atoms;
each $R^3$ independently represents hydrogen, alkyl, or aryl having up to about 10 carbon atoms or when taken together represent a cyclic alkylene or arylene group having up to 20 carbon atoms; and
a is equal to about 0.1 to about 50 mole per cent and b is equal to about 50 to about 99.9 mole per cent.

Preferably, a is equal to about 10 to about 40 mole per cent and b is equal to about 60 to about 90 mole per cent of the entire copolymer. Preferably, R is alkyl with 1 to 4 carbon atoms, hydrogen or benzyl; $R^2$ is hydrogen; and $R^3$ is alkyl with 1 to 10 carbon atoms or cyclohexyl.

The copolymers of the invention are considerably more resistant to moisture and hydrolysis than are the copolymers reported by Blevins and Turner, supra. Such copolymers represent new compositions of matter and provide significant advance over the known art.

These results were unexpected because maleimide is known to homopolymerize very readily, it was surprising that the useful copolymers of the invention were obtained.

The products of the invention are useful alone or as chemical intermediates. They may be incorporated into formulations as binders, dispersing agents, compatibilizers and the like. The copolymers are resinous materials which are valuable for use in plastics, coatings, laminating, adhesives, paper and cloth treatments and other arts. The products of the invention may also be cast as films. Some modifications of the invention may be used as reactive pollers or crosslinking agents.

DETAILS OF THE INVENTION

The process of the present invention comprises contacting, as reactants, (a) at least one monomer having the formula:

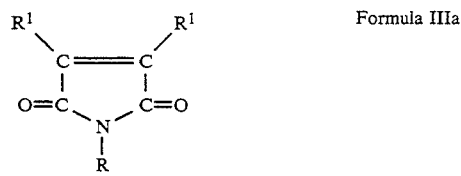

Formula IIIa wherein R' is as defined above; and
(b) at least one monomer having the formula:

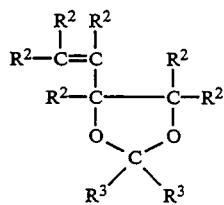

Formula I wherein:
each $R^2$ independently represents hydrogen or alkyl having 1 to 4 carbon atoms;
each $R^3$ independently represents hydrogen, alkyl, or aryl having up to about 10 carbon atoms or when taken together represent a cyclic alkylene or arylene group having up to 20 carbon atoms.

The reaction takes place in the presence of a free radical initiator.

Exemplary compounds of Formula I include 2-methyl-4-vinyl-1,3-dioxolane; 2-ethyl-4-vinyl-1,3-dioxolane; 2-propyl-4-vinyl-1,3-dioxolane; 2-butyl-4-vinyl-1,3-dioxolane; 2-hexyl-4-vinyl-1,3-dioxolane; 2-cyclopentyl-4-vinyl-1,3-dioxolane; 2-cyclohexyl-4-vinyl-1,3-dioxolane; 2-phenyl-4-vinyl-1,3-dioxolane; 2,2-dimethyl-4-vinyl-1,3-dioxolane; 2-ethyl-2-methyl-4-vinyl-1,3-dioxolane; 2,2-diethyl-4-vinyl-1,3-dioxolane; 2-methyl-2-propyl-4-vinyl-1,3-dioxolane; 2,2-dipropyl-4-vinyl-1,3-dioxolane; 2-(t-butyl)-2-methyl-4-vinyl-1,3-dioxolane; 2-ethyl-2-butyl-4-vinyl-1,3-dioxolane; 2-methyl-2-pentyl-4-vinyl-1,3-dioxolane; 2-methyl-2-(2-methyl)-propyl-4-vinyl-1,3-dioxolane; 2-methyl-2-(3-methyl)butyl-4-vinyl-1,3-dioxolane; 2-cyclohexyl-4-vinyl-1,3-dioxolane; 2-(2-methylcyclohexyl)-4-vinyl-1,3-dioxolane; 2-methyl-2-(3-methyl)butyl-4-vinyl-1,3dioxolane; 2-cyclohexyl-4-vinyl-1,3-dioxolane; 2-(2-methylcyclohexyl)-4-vinyl-1,3-dioxolane; 2-(4-methylcyclohexyl)-4-vinyl-1,3-dioxolane; 2-cyclopentyl-4-vinyl-1,3-dioxolane; 2-methyl-2-phenyl-4-vinyl-1,3-dioxolane; 2,2-diphenyl-4-vinyl-1,3-dioxolane.

Exemplary compounds of Formula IIIA include N-methylmaleimide, N-ethylmaleimide, N-propylmaleimide, N-isopropylmaleimide, N-butylmaleimide, N-sec-butylmaleimide, N-t-butylmaleimide, N-pentylmaleimide, N-decylmaleimide, N-dodecylmaleimide, N-cyclohexylmaleimide, N-phenylmaleimide, N-benzyl-maleimide, N-(4-methylphenyl)maleimide, N-(3-methylphenyl)maleimide, N-(2-methylphenyl)maleimide, N-(3,5-dimethylphenyl)maleimide, N-(4-iodophenyl) maleimide, N-(4-acetoxyphenyl) maleimide, and N-naphthylmaleimide.

The monomers of Formula I (4-vinyl-1,3-dioxolanes) used as reactants in this invention can be prepared by reacting a ketone or aldehyde with 3,4-epoxy-1-butene or a substituted derivative thereof. For the purposes of this invention, the dioxolane can be employed in the reaction mixture in which it is produced (in situ), or it may be recovered and subsequently used in the process of this invention. Methods of preparing the dioxolanes of the invention are fully described in commonly owned U.S. Pat. No. 5,019,635 (issued to Blevins and Turner, May 28, 1991), the entire contents of which are hereby incorporated by reference.

Non-reactive diluent solvent systems include both polar and non-polar chemicals such as toluene, heptane, ethyl ether, tetrahydrofuran, 2-butanone and others. Also, two or more solvents may be combined. The purpose of the solvent system is to permit contact of the monomers and facilitate polymerization. Solvents may also be selected for reasons not directly related to the polymerization step, such as ease of recovery or simplified isolation procedures. Additionally, the solvent may be chosen based on later uses for the product polymer, where the polymer is not isolated but used directly from the reaction mixture. As such, the choice of the solvent is unlimited as long as it does not inhibit, interfere with or otherwise have a deleterious impact on the polymerization, isolation or later applications. The choice of solvent and the monomer concentration may influence and alter the speed and yield of the polymerization process, as well as the molecular weight of the product polymer. Other factors such as economics, ease of recovery and toxicity may influence the choice of diluent solvents.

It is not necessary to add solvent to the reaction mixture. Instead, the 4-vinyl-1,3 dioxolane monomer is used in such amounts, preferably stoichiometric or in excess of the maleic anhydride derivative, that it acts as both a diluent solvent and a reactant. In this embodiment, a 4-vinyl-1,3 dioxolane which is liquid at the reaction temperature would dissolve enough of the maleic anhydride derivative monomer, initiator and the product polymer to permit polymerization to occur. This approach could simplify both the reaction and the recovery procedures.

In all embodiments of the invention, it is not necessary that the reactants be added to the reaction zone in the ratio expected or desired in the copolymer product; an excess of either reactant can be employed. There is no real upper limit on the amount of excess employed; this being defined by such secondary considerations as size of the reaction vessel, cost of the reactants, ease of separation of the starting materials from products, etc. In general, one uses from about 0.5 to about 5.0 moles of one reactant per mole of the other. However, it is to be understood that the composition of the polymer product is relatively insensitive to the ratio of reactants in the feed composition.

The polymerization reaction is initiated by a free radical generating composition. Such initiators may be selected from a wide variety of materials which are known to cause polymerization of ethylenically unsaturated monomers. These materials include, but are not limited to azobisisobutyronitrile (AIBN), peroxides, azides, redox initiators, and similar compounds familiar to those skilled in the art. The amount of initiator employed is not critical. One employs enough initiator to achieve the desired result. Generally speaking, the amount of initiator is from about 0.1 to 10 weight percent of any individual monomer in the reaction mixture. A skilled practitioner will recognize that more or less initiator may be used to obtain polymers of molecular weights somewhat outside the ranges stated in the claims.

If a redox initiator is used, a reaction temperature somewhat below the temperature used with free radical initiation may be desired. Thus, for example, redox initiators can be employed at room temperature or below. Similar processes of polymerization are also described in earlier cited, commonly-owned U.S. Pat. Nos. 5,071,930; 5,071,931, 5,071,932 and 5,013,806, the contents of which are herein incorporated in their entirety.

The temperature of the polymerization reaction may be varied over a wide range including temperatures over the boiling point of any of the reaction monomers or solvents when done under pressure. Several commercial processes for the manufacture of maleic anhydride copolymers, discussed by B. M. Culbertson, *Encyclopedia of Polymer Science and Engineering*, Vol. 9, pp. 225–294 (1987), involve the use of pressure reactions to increase molecular weight. In most cases the polymerization temperature will be within the range of −10 to 180 degrees centigrade, more particularly within the range of 15 to 120 degrees, depending upon the initiator system employed and other influencing factors. For example, most redox initiators are employed at room temperature or below, whereas free-radical initiators require higher temperatures. The reaction is allowed to continue for a time sufficient to allow the copolymer product to form. The process time can be seconds, or up to 48 hours, depending on whether the process is continuous or whether an intermediate is first recovered.

During the polymerization reaction, the vinyl dioxolane reactant and the maleimide reactant are incorporated unevenly in the polymer chain. The higher relative reactivity of most maleimide monomers, compared with vinyl dioxolanes, causes them to be incorporated at a faster rate and the resulting copolymers tend to contain a higher percentage of maleimide repeat units than of vinyl dioxolane repeat units. The copolymers obtained from this reaction also tend to vary in composition with time; that is, the first copolymers tend to be maleimide-rich, but as the maleimide monomer units are depleted from the reaction mixture, the copolymers tend to incorporate more and more of the less reactive vinyl dioxolane monomer. In this embodiment, the copolymer of this invention would have repeat units of both Formula I and Formula III, and the number of maleimide units (III) is greater than the number of dioxolane units (I). Also, maleimide units may follow each other (-III-III-III-)$_n$, where n is indefinite, but dioxolane units would not. This polymerization process produces a copolymer in which the monomer units are unevenly distributed.

Representative polymerizations of 4-vinyl-1,3 dioxolane and maleimide follow.

EXAMPLES

EXAMPLE 1

In a dry glove box under helium, 2,2-dimethyl-4-vinyl-1,3-dioxolane (0.641 gram, 5 mmol), N-phenyl maleimide (0.866 gram, 5 mmol), azobisisobutyronitrile (AIBN) (0,016 gram, 0.1 mmol) and 1.5 grams of dry 2-butanone were combined in a Claisen bottle with a magnetic stirrer and then sealed. The reaction mixture was heated with stirring in an oil bath at 70° C. for 20 hours. The product polymer rapidly precipitated out of solution and coated the walls of the Claisen bottle during the reaction. The reaction mixture was diluted with 5 grams acetone and precipitated into methanol. The solid product was collected using suction filtration and dried under vacuum at 40° C. for 20 hours. Yield was 0.94 gram, 62% theory. Mn=5430, Mw=12,300, Mw/Mn=2.27. Integration of the phenyl region versus the dimethyl region of the NMR spectrum indicates a 3.2 to 1 ratio of the maleimide to the dioxylane in the product copolymer. The values for combustion analysis were consistent with a 3 to 1 ratio of the maleimide to the dioxolane.

EXAMPLE 2

In a dry glove box under helium, 2-ethyl-2-methyl-4-vinyl-1,3-dioxolane (0.71 gram, 5 mmol), N-(p-iodophenyl) maleimide (1.50 grams, 5 mmol), AIBN (0,016 gram, 0.1 mmol) and 2.21 grams of dry 2-butanone were combined in a Claisen bottle with a magnetic stirrer and then sealed. The reaction mixture was heated with stirring in an oil bath at 70° C. for 24 hours. The reaction mixture was dissolved with 5 grams dimethyl acetamide and precipitated into ethyl ether. The solid product was collected using suction filtration and dried under vacuum at 40° C. for 20 hours. Yield was 1.02 gram, 46% theory. Mn=3940, Mw=30,300, Mw/Mn=7.69. Integration of the phenyl region versus the methyl region of the NMR spectrum indicates approximately a 3 to 1 ratio of the maleimide to the dioxolane in the product copolymer. Combustion analysis: found N=4.12, C=43.24, H=3.05; calculated for 32 parts maleimide to 10 parts dioxolane N=4.08, C=43.71, H=3.04.

EXAMPLE 3

In a dry glove box under helium, 2-ethyl-2-methyl-4-vinyl-1,3-dioxolane (0.71 gram, 5 mmol), N-methylmaleimide (0,556 grams, 5 mmol), AIBN (0,016 gram, 0.1 mmol) and 3.75 grams of dry THF were combined in a Claisen bottle with a magnetic stirrer and then sealed. The reaction mixture was heated with stirring in an oil bath at 70° C. for 24 hours. The reaction mixture was dissolved with 5 grams dimethylacetamide and precipitated into ethyl ether. The solid product was collected using suction filtration and dried under vacuum at 40° C. for 20 hours. Yield was .65 gram, 51% theory. Mn=1390, Mw=2180, Mw/Mn=1.75. NMR and combustion analysis were consistent with an approximate 3 to 1 ratio of the maleimide to the dioxolane in the product copolymer.

EXAMPLE 4

In order to observe the effect of reaction time versus copolymer composition, a polymerization was conducted where samples were isolated at timed intervals. In a dry glove box under helium, 2,2-dimethyl-4-vinyl-1,3-dioxolane (4.101 gram, 32 mmol, N-phenyl maleimide (5.541 gram, 32 mmol), AIBN (0,106 gram, 0.64 mmol) and 19.2 grams of dry 2-butanone were combined and stirred until homogenous. The mixture was divided into 7 equal portions, placed in Claisen bottles with a magnetic stirrer and then sealed. The reaction mixture was heated with stirring in an oil bath at 70° C. for the given timed intervals. The reaction mixtures were diluted with acetone and precipitated into methanol. The solid product was collected using suction filtration and dried under vacuum at 40° C. for 20 hours.

| TIME | % YIELD | Mw | Ratio of Diox : Maleim. (NMR) |
|---|---|---|---|
| 20 minutes | 17 | 14,200 | 0.19 |
| 40 minutes | 42 | 12,500 | 0.22 |
| 60 minutes | 39 | 12,800 | 0.23 |
| 90 minutes | 56 | 12,000 | 0.26 |
| 2 hours | 62 | 11,200 | 0.28 |
| 4 hours | 64 | 11,200 | 0.30 |
| 22 hours | 65 | 11,100 | 0.30 |

EXAMPLE 5

In a dry glove box under helium, 2,2-dimethyl-4-vinyl-1,3-dioxolane (2.0 grams, 15.6 mmol), N-phenyl maleimide (0.40 gram, 2.3 mmol) and AIBN (0.02 gram, 0.12 mmol) were combined in a Claisen bottle with a magnetic stirrer and then sealed. The reaction mixture was heated with stirring in an oil bath at 70° C. for 24 hours. The reaction mixture was diluted with 5 grams dimethylacetamide and precipitated into methanol. The solid product was collected using suction filtration and dried under vacuum at 40° C. for 20 hours. Yield was 0.62 gram, 89% theory for a 1 to 1 polymer. $Mn=6030$, $Mw=9300$, $Mw/Mn=1.54$. Combustion analysis and integration of the NMR spectrum indicate a 0.84 ratio of the dioxolane to the maleimide in the product copolymer.

EXAMPLE 6

In a dry glove box under helium, 2,2-dimethyl-4-vinyl-1,3-dioxolane (1.28 grams, 10 mmol), maleic anhydride (0.74 gram, 7.5 mmol) N-phenyl maleimide (0.43 gram, 2.5 mmol), AIBN (0.016 gram, 0.1 mmol) and 4.9 grams of dry 2-butanone were combined in a Claisen bottle with a magnetic stirrer and then sealed. The reaction mixture was heated with stirring in an oil bath at 70° C. for 20 hours. The reaction mixture was diluted with 5 grams dimethylacetamide and precipitated into methanol. The solid product was collected using suction filtration and dried under vacuum at 40° C. for 20 hours. Yield was 1.10 grams, 45% theory. $Mn=3110$, $Mw=5470$, $Mw/Mn=1.76$.

EXAMPLE 7

In a dry glove box under helium, 2,2-dimethyl-4-vinyl-1,3-dioxolane (0.65 grams, 6.7 mmol), maleic anhydride (0.85 grams, 6.7 mmol), AIBN (0.011 gram, 0.07 mmol) and 3 grams of dry 2-butanone were combined in a Claisen bottle, fitted with a magnetic stirrer and sealed. The reaction mixture was heated and precipitated into a heptane/ethyl ether (2:1) mixture. The solid product was collected using suction filtration and dried under vacuum at 40° C. for 20 hours. Yield was 0.51 grams of a maleic anhydride/dioxolane copolymer 33% theory. $Mn=2620$, $Mw=4390$, $Mw/Mn=1.68$.

EXAMPLE 8

The amidation of a maleic anhydride/dioxolane copolymer of Example 7 was accomplished as follows. The procedure described in Example 7 was repeated, but prior to precipitation 1.2 grams (13 mmols) of distilled aniline was added and the sealed vial was heated at 45° C. for 30 minutes. The reaction mixture was diluted with 5 grams acetone and precipitated into a heptane/ethyl ether (2:1) mixture. The solid product was collected using suction filtration and dried under vacuum at 40° C. for 20 hours. Yield was 1.40 grams of a maleamic acid/dioxolane copolymer 64% theory. $Mn=2660$, $Mw=4640$, $Mw/Mn=1.74$.

EXAMPLE 9

The maleamic acid copolymer of Example 8 was cyclized as follows. The procedure described in Example 8 was repeated, but prior to precipitation pyridine (2 grams, 25 mmol) was added, the solution stirred for 15 minutes, followed by the addition of 3 grams (29 mmol) of acetic anhydride. The solution was heated to 50° C. and stirred for 1 hour. The reaction mixture was then diluted with 5 grams acetone and precipitated into a heptane/ethyl ether (2:1) mixture. The solid product was collected using suction filtration and dried under vacuum at 40° C. for 20 hours. Yield was 0.54 grams of a maleimide/dioxolane copolymer 27% theory. $Mn=2900$, $Mw=5420$, $Mw/Mn=1.87$. The NMR spectrum indicates that the phenyl group has been incorporated in an approximately 1 to 1 ratio with the dioxolane group. The NMR spectrum is similar to the spectrum of a copolymer obtained by polymerizing a preformed n-phenyl maleimide monomer with a 2,2-dimethyl-4-vinyl-1,3-dioxolane monomer.

EXAMPLE 10

The amidation of a dried maleic anhydride/dioxolane copolymer as made in Example 7 was accomplished as follows. A 0.40 gram portion of the dry copolymer was dissolved in 3.5 grams of dry 2-butanone, and 1.2 grams (13 mmols) of distilled aniline was added. The reaction mixture was heated at 45° C. for 30 minutes. The reaction mixture was then diluted with 4 grams acetone and precipitated into a heptane/ethyl ether (2:1) mixture. The solid product was collected using suction filtration and dried under vacuum at 40° C. for 20 hours. Yield was 0.47 grams of a maleamic acid/dioxolane copolymer 81% theory. $Mn=2660$, $Mw=4330$, $Mw/Mn=1.63$.

EXAMPLE 11

The imidization of a dried maleic anhydride/dioxolane copolymer as made in Example 7 was accomplished as follows. A 0.30 gram portion of the dried maleic anhydride/dioxolane copolymer was dissolved in 3.0 grams of dry 2-butanone and 1.2 grams (13 mmols) of distilled aniline was added. The reaction mixture was heated at 45° C. for 30 minutes. Pyridine (1 gram, 13 mmol) was added, the solution stirred for 15 minutes, followed by the addition of 1.5 grams (15 mmol) of acetic anhydride. The solution was heated to 50° C. and stirred for 1 hour. The reaction mixture was diluted with 5 grams acetone and precipitated into a heptane/ethyl ether (2:1) mixture. The solid product was collected using suction filtration and dried under vacuum at 40° C. for 20 hours. Yield was 0.35 grams of a maleimide/dioxolane copolymer 81% theory. $Mn=2820$, $M2=4580$, $Mw/Mn=1.62$. The NMR spectrum indicates that the phenyl group had been incorporated in the polymer, but not as much as in Example 9. The NMR spectrum is similar to the spectrum of the copolymer obtained in Example 9 and to the NMR spectrum of a copolymer of a preformed N-phenyl maleimide monomer with a 2,2-dimethyl-4-vinyl-1,3-dioxolane monomer.

EXAMPLE 12

In a dry glove box under helium, 3,4-epoxy-1-butene (0.70 gram, 10 mmol), N-methyl maleimide (1.11 gram, 10 mmol), AIBN (0.032 gram, 0.2 mmol) and 3.62 grams of dry 2-butanone were combined in a Claisen bottle with a magnetic stirrer and then sealed. The reaction mixture was heated with stirring in an oil bath at 70° C. for 20 hours. The product polymer gradually precipitated out of solution and coated the walls of the Claisen bottle during the reaction. The reaction mixture was diluted with 5 grams THF and precipitated into ethyl ether. The solid product was collected using suction filtration and dried under vacuum at 40° C. for 20 hours. Yield was 1.02 gram, 56% theory. $Mn=1620$, $Mw=2780$, $Mw/Mn=1.72$. NMR indicated both 1,2- and 1,4-propagation of epoxybutene. The methyl group of the maleimide was present.

EXAMPLE 13

In a dry glove box under helium, 3,4-epoxy-1-butene (1.40 gram, 20 mmol), N-phenyl maleimide (1.73 gram, 10 mmol), AIBN (0,032 gram, 0.2 mmol) and 1.57 grams of dry 2-butanone were combined in a Claisen bottle with a magnetic stirrer and then sealed. The reaction mixture was heated with stirring in an oil bath at 70° C. for 20 hours. The reaction mixture was diluted with 5 grams acetone and precipitated into methanol. The solid product was collected using suction filtration and dried under vacuum at 40° C. for 20 hours. Yield was 1.23 gram, 39% theory. Mn=3530, Mw=5830, Mw/Mn=1.65. NMR indicated both 1,2- and 1,4-propagation of epoxybutene. Integration of the phenyl group of the maleimide indicates an approximate ratio of 1 to i relative to 3,4-epoxy-1-butene derived peaks.

EXAMPLE 14

In a dry glove box under helium, 3,4-epoxy-1-butene (0.56 gram, 8 mmol), maleic anhydride (0,784 gram, 8 mmol), 4.03 grams of anhydrous 2-butanone and AIBN (0.013 gram, 0.08 mmol) were combined in a Claisen bottle with a magnetic stirrer and then sealed. The reaction mixture was heated with stirring in an oil bath at 70° C. for 24 hours. The reaction mixture was diluted with 5 grams of 2-butanone and precipitated into ethyl ether. The solid product was collected using suction filtration and dried under vacuum at 50° C. for 20 hours. Yield was .32 gram, 24% theory. Mn=1690, Mw=4730, Mw/Mn=2.80. NMR indicated both 1,2-and 1,4-propagation of epoxybutene. The peaks consistent with the incorporation of 2,2-dimethyl-4-vinyl-1,3-dioxolane (formed in situ) are present.

EXAMPLE 15

Example 7 was derivatized as follows. The procedure for Example 7 was repeated and prior to opening the reaction vial, 1 gram (10.7 mmoles) of aniline in 2 grams of 2-butanone were added. The reaction mixture was stirred an additional hour at 70° C. The sample was precipitated and dried as described in Example 7. Yield was 1.50 gram, 71% theory. Mn=845, Mw=2820, Mw/Mn=3.34. NMR indicated both 1,2- and 1,4-propagation of epoxybutene. The peaks for 2,2-dimethyl-4-vinyl-1,3-dioxolane and phenyl groups (from an aniline-derived amide group) are present.

EXAMPLE 16

Example 8 was cylclized as follows. The procedure for Example 8 was repeated and prior precipitation, pyridine (2 grams, 25 mmol) was added. The solution was stirred for 15 minutes, followed by the addition of 3 grams (29 mmol) of acetic anhydride. The solution was heated to 50° C. and stirred for 1 hour. The sample was precipitated and dried as described in Example 7. Yield was 0.97 gram, 46% theory. Mn=876, Mw=2900, Mw/Mn=3.31. NMR indicated both 1,2- and 1,4-propagation of epoxybutene. The peaks for the 2,2-dimethyl-4-vinyl-1,3-dioxolane are present.

EXAMPLE 17

The amidation of the dried maleic anhydride/epoxybutene copolymer of Example 7 was accomplished as follows. A 0.23 gram portion of the dry copolymer was dissolved in 2 grams of dry 2-butanone, and 0.5 gram (5.3 mmols) of distilled aniline was added. The reaction mixture was heated at 50° C. for 30 minutes. The reaction mixture precipitated into a heptane/ethyl ether (2:1) mixture. The solid product was collected using suction filtration and dried under vacuum at 40° C. for 20 hours. Yield was 0.25 grams of a maleamic acid/dioxolane copolymer 80% theory. Mn=1800, Mw=3260, Mw/Mn=2.37.

EXAMPLE 18

The maleamic acid copolymer of Example 10 was cyclized as follows. A 0.23 gram portion of the dry copolymer was dissolved in 2 grams of dry 2-butanone, and 0.5 gram (5.3 mmols) of distilled aniline was added. The reaction mixture was heated at 50° C. for 30 minutes. The reaction mixture precipitated into a heptane/ethyl ether (2:1) mixture. Pyridine (1 gram, 13 mmol) was added, the solution stirred for 15 minutes, followed by the addition of 1.5 grams (15 mmol) of acetic anhydride. The solution was heated to 50° C. and stirred for 1 hour. The reaction mixture was diluted with 5 grams acetone and precipitated into a heptane/ethyl ether (2:1) mixture. The solid product was collected using suction filtration and dried under vacuum at 50° C. for 20 hours. Yield was 0.26 grams of a maleimide/dioxolane polymer 83% theory. Mn=1890, Mw =4350, Mw/Mn=2.37. The NMR spectrum indicates less aniline has been incorporated into this polymer than for the polymer of Example 9.

Although this invention has been described with reference to preferred embodiments thereof, it will be understood that variations and modifications can be effected within the spirit and scope of the invention as described above and as defined in the appended claims.

We claim:

1. A process for preparing a copolymer comprising polymerized repeating monomeric units of (a) a maleimide reactant and (b) a 4-vinyl-1,3-dioxolane reactant which comprises contacting:

(i) a maleimide reactant having up to about 24 carbon atoms; and (ii) a dioxolane reactant having the formula:

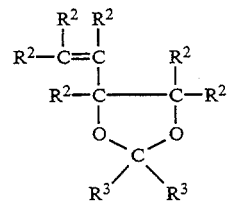

Formula I wherein:

each $R^2$ independently represents hydrogen or alkyl having 1 to 4 carbon atoms; and each $R^3$ independently represents hydrogen, alkyl, or aryl having up to about 10 carbon atoms or when taken together represent a cyclic alkylene or arylene group having up to 20 carbon atoms;

said process being conducted in the presence of a free radical initiator, at a temperature within the range of from $-10°$ C. to about 180° C.

2. The process described in claim 1 wherein the free radical initiator is a peroxide or azobisisobutyronitrile.

3. The process described in claim 1 carried out in the presence of a non-polar solvent, ketone, ester or aldehyde.

4. The process described in claim 1 carried out in the absence of added solvent.

* * * * *